United States Patent [19]

Wlcek et al.

[11] 4,388,488
[45] Jun. 14, 1983

[54] SEALING SYSTEM FOR A LONGITUDINALLY DIVIDED CABLE FITTING ELEMENT

[75] Inventors: Rudolf Wlcek, Haar; Dieter Kunze, Neuried, both of Fed. Rep. of Germany

[73] Assignee: Siemens Aktiengesellschaft, Berlin & Munich, Fed. Rep. of Germany

[21] Appl. No.: 184,989

[22] Filed: Sep. 8, 1980

[30] Foreign Application Priority Data

Sep. 27, 1979 [DE] Fed. Rep. of Germany ....... 2939241

[51] Int. Cl.³ .......................... H02G 15/18; H02G 3/04
[52] U.S. Cl. ..................................... 174/92; 138/166; 174/DIG. 8; 174/DIG. 11
[58] Field of Search ..................... 174/92, 93, DIG. 8, 174/DIG. 11; 138/166, 168, 156; 285/381

[56] References Cited

U.S. PATENT DOCUMENTS

| | | | |
|---|---|---|---|
| 3,379,218 | 4/1968 | Conde | 174/DIG. 8 |
| 3,455,336 | 7/1969 | Ellis . | |
| 3,846,575 | 11/1974 | Troy | 138/168 |
| 3,910,448 | 10/1975 | Evans | 285/381 X |

FOREIGN PATENT DOCUMENTS

| | | |
|---|---|---|
| 1947057 | 3/1970 | Fed. Rep. of Germany . |
| 7423507 | 11/1974 | Fed. Rep. of Germany . |
| 2543358 | 4/1976 | Fed. Rep. of Germany ...... 138/156 |

*Primary Examiner*—Roy N. Envall, Jr.

*Attorney, Agent, or Firm*—Hill, Van Santen, Steadman, Chiara & Simpson

[57] ABSTRACT

A sealing system for a cable fitting element of heat shrinkable material having a longitudinally extending opening with at least one longitudinally extending bead portion being disposed along a side of the opening and being receivable in a clamp portion forming a seal of the opening characterized by one of the clamp portions and bead portions being substantially rigid and unaffected by heat and the other of said bead and clamp portions having a permanent shape which is tightly engaged with the one portion to form a seal. To facilitate assembly, the other portion has a temporary shape and has been deformed to a temporary shape to enable easy assembly and will return to the permanent shape when the fitting element is heated to an elevated temperature for the shrinking process. In one embodiment, the clamp portion is a separate rigid member and the bead portion projects along the opening having one surface forming a sealing surface and the other surfaces engaged by the clamp. In another embodiment, the bead portions are adjacent sealing surfaces and the clamp member is telescopically received in the area and provides for a shrinkable portion of the fitting element. In a third embodiment, the seal is formed by a snap-fit between the clamp member which has a groove for receiving a projection of the bead portion and one of the two members or portions will be changed under the affect of heat to cause the engagement.

9 Claims, 11 Drawing Figures

SEALING SYSTEM FOR A LONGITUDINALLY DIVIDED CABLE FITTING ELEMENT

BACKGROUND OF THE INVENTION

The present invention is directed to an improved sealing system which utilizes a clamp-type compression member for sealing a longitudinally extending opening of a longitudinally divided cable fitting of a heat shrinkable or contractable material.

In order to fit a shrinkable sleeve component which includes sleeve heads, sleeve tubes or sleeve collars on an uncut cable, the sleeve component must have a longitudinally extending opening which is sealed tight at its joint faces or surfaces with the aid of a gripping or compression member and an adhesive which is normally a thermoplastic adhesive which will utilize the heat occurring during the shrinking process following installation. In the case of shrink collars and sleeve heads, the sealing surfaces themselves or only the overlapping sealing surfaces are coated with a thermoplastic adhesive and the clamp tight compression members are pushed over the sealing elements which are formed by bead portions that extend next to the sealing surfaces. Known compression members are formed of strips of metal and have the shape of either a C-shaped cross-section such as disclosed in German OS No. 15 25 815 or a U-shaped cross-section as disclosed in German Gebrauchmuster No. 74 23 507. With relatively rigid compression members, a loose fit is provided between the bead portions of the shrink-on part and compression member. Although this means that the clamp-type compression member can be fitted easily, the adhesive is not compressed sufficiently during contraction and in some cases large gaps will occur between the sealing surfaces which cannot always be completely filled with the adhesive. In the case of overlapping joint faces in which no adhesive is used, an excessively loose fit between the clamping element and the bead portions is very disadvantageous because the bead portions may easily slip out of the clamping element during the contraction of the device. Although it is possible to alleviate this disadvantage by means of a spring loaded compression element or member, the necessary pretensioning of the compression member or element makes it difficult to assemble it onto the bead portions.

SUMMARY OF THE INVENTION

The present invention is directed to providing a solution to the problem of producing a sealing element for a cable fitting of a heat contractable material wherein during the first stage of assembly, the joint or sealing surfaces can be easily brought together and during the shrinking process the sealing elements will adapt themselves automatically to insure a tight fit and a seal which is free of play.

To accomplish these tasks, the present invention is directed to an improvement in a sealing system for a longitudinally divided cable fitting element of heat shrinkable material having a longitudinally extending opening, said sealing system including the fitting element having at least one longitudinally extending bead portion being disposed along a side of said opening and being receivable in a clamp portion to form a seal of the opening. The improvement comprises that one of the beads and clamp portions is substantially rigid and not affected by heat, the other of the bead and clamp portions having a permanent shape which is tightly engaged with said one portion to form a seal, said other portion being deformed from the permanent shape to a temporary shape to enable easy assembly of the portions and returning to the permanent shape when the fitting element is heated to an elevated temperature for a shrinking process so that the portions are easily assembled to close the opening and then treated to create a tight sealing fit.

In one embodiment of the invention, the fitting element has a pair of sealing surfaces extending on each side of the opening with each sealing surface having bead portions associated therewith. The clamp element holds the bead portions in tight engagement to force the sealing surfaces into a sealing enclosure after the heating process. Thus a pair of bead portions have been stretched or preformed to a temporary shape in such a manner that the compression member which may be a clamp-shaped strip can be easily assembled thereon and the bead portion will return to the original permanent shape after the shrinking process due to the effect of heat to create pressure on the sealing surfaces to form the tight seal. These bead portions can be outwardly extending projections that extend along the sealing surface and are engaged by the clamp element which is a separate unit. The bead portions can also be adjacent to the sealing surface and are engaged by a clamp element which is telescopically received within the tube and will act as a support for the outer skin during the shrinking operation.

In another embodiment of the invention the clamp element is integral with the fitting element along one side of the edge and receives the head portion to form a snap fit. The clamp portion will have a longitudinally extending groove with undercuts forming shoulders and the bead will have undercuts corresponding to the shoulders. If the bead is changed from a permanent shape to a temporary shape, then it will be received loosely in the clamp portion and then during the heat shrinking process change shape to tightly engage the groove and shoulders of the clamp element. If the clamp element is changed, its temporary shape has an expanded position which will shrink down onto the bead to complete the tight snap fit.

The most important aspect of the invention is seen in that one of the portions which is positioned along the sealing surfaces of the cable fitting element is preformed during the production process in such a manner that it assumes a temporary shape which will enable easy insertion of the clamp portion onto the bead portion. During the subsequent shrinking process, the mounted cable fitting element is heated above a softening point so that it begins to contract. During this process, the portion which has been previously in a temporary shape will revert to its original permanent shape due to the shape or elastic memory of the material. This permanent shape is chosen so that the sealing element portions will embrace one another with sufficient compression to form the seal. In addition, a certain amount of pressure is exerted on the joint surfaces due to their being clasped by the compression member so that the adhesive which was softened during the heating process is compressed and distributed evenly over the surface plates.

While the portions may have various shapes, one embodiment has the bead portions as projections which extend along each of the sealing surfaces and these projections have been preformed in such a way that when they relax a return to the permanent shape during the shrinking process, they will embrace the individual compression clamp-like member and thus exert the required closing pressure or compression forces on the sealing surfaces. With the paired beads of identical shape the clamp-tight compression member which encloses the beads are particularly suitable for pressing sealing surfaces together. It can also be advantageous to preshape the sealing surfaces themselves so that the bead portions extend adjacent to the sealing surface in such a way that a compression member engaging the bead portions adjacent to the sealing surfaces will provide sufficient forces to insure a good seal after the shrinking process.

In an embodiment of the invention the bead portion is formed with a part of a snap-in seal with the clamping portion receiving it in a snap-fit. When the two portions are pressed against each other due to a reversion to the permanent or original shape, sufficient forces between the portions will create the desired seal.

It is also advisable to carry out the preshaping or preforming of the bead portions, which are projections or are portions adjacent the joining surfaces, during the production process in conjunction with the expanding or stretching process. In this case, the surface of the part or portion to be formed is heated above the softening point and pressed with the appropriate clamped-shaped jaws while the area of the part to be expanded or shaped are shaped by pneumatic or mechanical means.

DESCRIPTION OF THE PREFERRED EMBODIMENTS

Figure 11:
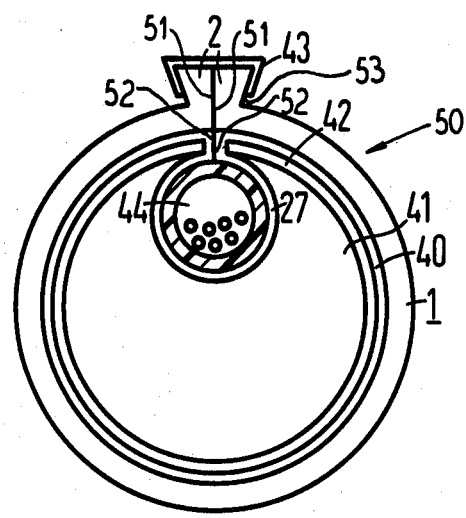
FIG. 11 is an end view with portions in cross-section of a finished cable assembly fitting utilizing the sealing system in accordance with the present invention.

The principles of the present invention are particularly useful for providing the sealing system for a cable fitting generally indicated at 50 in FIG. 11. The cable fitting 50 includes a cable fitting element in the form of a slit sleeve tube 1, which has a longitudinal opening defined by a pair of end surfaces or sealing surfaces 51 which have bead portions in the form of projections 2 adjacent the surfaces 51. To hold the surfaces 51 in tight engagement, a clamp type compression member 43 grips the undercuts 53 of the bead portions or projections 2.

As also can be seen in FIG. 11, the end of the cable fitting 50 is closed off by a sleeve head 41, which has a peripheral rim 40 on which the sleeve tube 1 is mounted to form a seal. A reinforcing ring 42 is telescopically received within the rim 40 and acts as a clamping member for holding sealing surfaces 52 of the head 41 in tight sealing engagement. As illustrated, when the surfaces 52 are in tight sealing engagement they close a longitudinal opening or slit for a cable guide socket 27 of the sleeve head 41 and the socket 27 is adapted to receive the cable 44.

Initially during assembly, the compression member 42 lies loosely against the outer wall of the sealing surfaces of the head 41 which receives the cable 44 in the socket 27. In a similar manner, the bead portions 2 are loosely received in the clamp element 43. After the heating of the assembly for the shrinking process to occur, the sealing surfaces 52 of the sockets 27 will be reshaped as discussed hereinafter to tightly grip the ends of the compression member 42. In this way, the sealing faces or surfaces 52 are tightly pressed together.

It should also be noted, that the sleeve head 41 is illustrated as having only a single cable guide socket 27 with one cable 44 inserted therein. It is also possible to insert several such cables into the socket in the same manner.

It should be noted that in the FIGS. 1-10, the temporary shape of the portion which is the preformed stage created by deforming the element is illustrated in broken line. The solid lines show the shape of the portion after free, unhindered shrinking process has taken place in which the portion has reassumed the permanent shape. In regards to FIGS. 1-6, only a single bead is illustrated for purposes of clarification.

The sleeve tube 1 has a bead portion 2, which is in the shape of a projection located at the edge of the opening. The second corresponding portion illustrated in FIG. 11 is a mirror image of the illustrated portion. The sealing element formed by the bead portion 2 has a wedge shaped undercut 53 on an outer surface, which is away from a sealing surface or joint face so that a compression member such as a U-shaped channel or U-shaped clamping member 43 can grip the bead portion and be easily slid thereon. In the temporary shape which is a stretched or deformed form, the bead portion has an extension 4 extending downward from the interior towards the interior of the sleeve tube 1. Thus, the size of the clamp element is large enough to enable it to be easily slipped over the two sealing elements 2 when they are pressed together. During the heating which occurs during the shrinking process, the bead portion 2 will revert to its original permanent shape which has a projection 3 on the sealing surface to press the element against the compression member or clamp such as 43 so that the joint faces are forced together at the bottom section. Any adhesive which was introduced between the sealing surfaces will be evenly distributed in its molten state and simultaneously compressed. On conclusion of the shrinking process and after cooling down, the sealing element will remain in this relaxed or permanent position so that the above conditions are maintained.

Figure 1:
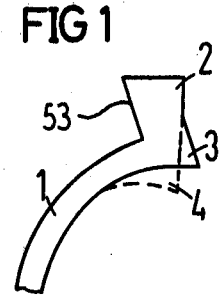
FIGS. 1-6 are end views of six variations of an embodiment of the bead portion of the sealing system of the present invention with FIG. 1 showing a bead portion with a change in the shape of the sealing surface, FIG. 2 showing a bead portion having a change in the shape of both the bead portion and the sealing surface, FIG. 3 showing a bead portion of a different configuration having a change in shape, FIG. 4 showing another embodiment or bead portion having a change in shape, FIG. 5 showing another variation in the design of the bead portion that changes shape, and FIG. 6 showing a still further modification of a bead portion that changes shape.
Figure 2:
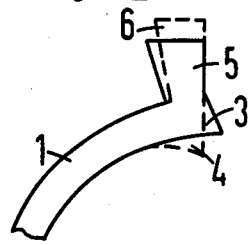

In a variation illustrated in FIG. 2, the sealing element or the bead portion 5 has a permanent shape substantially the same as the portion 2. However, in the temporary shape in addition to having the inwardly extending portion 4, the bead portion 5 has been stretched into the condition or shape 6 which is narrower and thinner. Thus, it is particularly easy to slide a compression member onto the pair of bead portions of the variation illustrated in FIG. 2. After the shrinking process, the temporary shape will return to the permanent shape so that after the shrinking process, the bead portion will have the shape 5 of FIG. 2 and produce a double affect, first the joint or sealing surfaces being pressed firmly against each other and secondly the undercuts of the portion are snugly engaged by the clamp type compression member.

Figure 3:
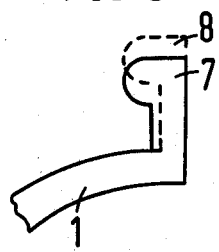

A variation of the bead portion as a projection or sealing element is illustrated in FIG. 3 with the permanent configuration shown by the bead portion 7. In this case, the bead portion is stretched to a temporary shape 8. During the shrinking process, the material will revert to the original permanent shape and completely fill the clamp-like member and thus will exert the required pressure on the joint or sealing surfaces. In this case, the sealing surfaces are plain surfaces during the entire process and enable the two elements or projection portions 7 to be brought precisely together.

Figure 4:
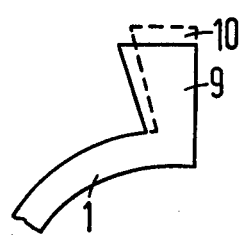
Figure 5:
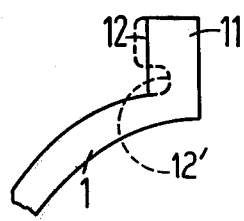

Another variation of the bead portion as projection is illustrated in FIG. 4. In this variation the permanent shaped bead portion 9 has a wedge-shaped undercut, which is stretched to a thinner condition or shape 10 for the temporary shape. As with the variation of FIG. 3, during the heating and the shrinking process the thin wedge-shaped portion 10 will revert to the permanent shape of the portion 9.

In another variation, the bead portion 11 has a permanent shape similar to a rectangle. When using clamp-type compression members, which mainly grip only at their inturned edges, the temporary shape 12 has a slot or undercut 12' to enable easy assembling of the clamp element onto the pair of bead portions. During the heating of the shrinking process, material is displaced into the area of the slot 12' as the bead portion contracts to the relaxed or permanent state illustrated in unbroken lines. Such displacement leads to the disappearing of the groove or undercut 12' so that a spring action of the compression member or clamp element will maintain a constant pressure on the sealing surfaces.

Figure 6:
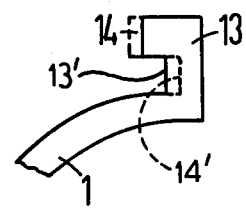

In FIG. 6, another variation of the bead member as a projection is illustrated. In this situation, the procedure is completely identical but the bead portion 13 in the permanent shape has an undercut or a slot 13'. In the pre-stretched temporary shape illustrated in broken lines 14, the external shape corresponds fully to the previous example with the slot 14' being substantially deeper. During heating, the elastic member will cause the temporary shape to move to the permanent shape with the shallower slot or undercut 13'. However, due to the difference in the elastic memory of the two examples of FIG. 6 and FIG. 5, the displacement and flow of materials is different. This is due to the fact that after having been forceably performed by stretching or similar deforming, the material will revert to its original shape on being heated. Thus, if the original permanent shape of the contractive object is different even if they are forceably preformed in the same manner, each object will revert to its original form or shape during the shrinking process. This way any number of examples can be shown which look completely identical in the assembled stage but which assume completely different shapes in the permanent relaxed state after the shrinking process.

Figure 7:
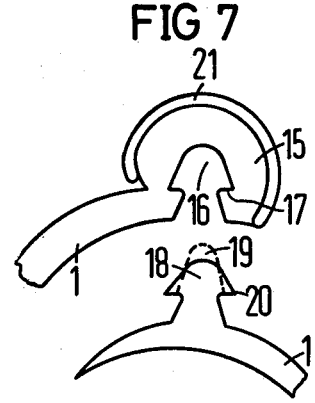
FIG. 7 is an end view of an embodiment of the sealing system of the present invention in which the bead member is received in a clamp member with a snap-fit.

A sealing system in which the edges of the sleeve tube 1 are provided with sealing elements which snap into each other, is illustrated in FIG. 7. In this embodiment, the clamp element 15 is integrally formed on one edge of the sleeve tube 1 while the bead portion 18 is formed on or adjacent the other edge. As illustrated, the clamp element 15 is designed as an outwardly extending bead with an inwardly facing or radial groove 16 which has undercuts 17 to form shoulders. The bead portion 18 in the permanent shape also has outwardly extending shoulders 20 to coact with the shoulders of the undercut 17 to form a tight engagement between the two members. In this embodiment, the bead portion 18 was pre-stretched or stressed into a thin projection 19 so that it can be easily introduced into the groove 16. During a shrinking process, the inserted sealing element 19 expands into its original shape 18 due to heat so that it will embrace even more firmly the groove 16. A spring loaded compression member 21 is placed over the sealing or clamp element 15 to insure that a constant pressure is maintained on the joint surfaces within the groove and the member 21 also provides additional safeguards against an unintentional opening.

Figure 8:
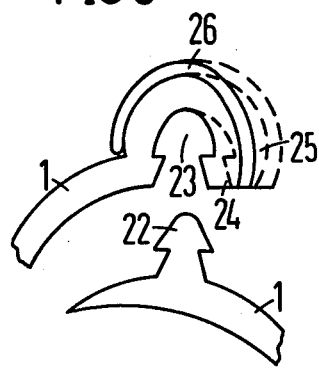
FIG. 8 is another end view of an embodiment or variation of the snap-fit of a sealing system in accordance with the present invention.

In the embodiment of FIG. 7, the bead portion changes from a temporary to a permanent shape and in the embodiment of FIG. 8, the bead portion 22 has a permanent shape which is substantially the permanent shape of the portion 18. The clamp portion 24 has a permanent shape with a groove 23 having undercuts forming shoulders and has a permanent shape similar to that of the clamp portion 15. Prior to assembly, the clamp portion 24 has been stretched or expanded into a temporary shape 25 with the groove 24 being opened out. Thus the sealing element formed by the bead portion 22 can be easily pushed into the groove 23. During the shrinking process, the clamp will return to a relaxed permanent shape so that this clamp portion 24 with the groove 23 becomes narrower so that the joint faces or sealing surfaces are pressed tightly together without play. A spring-loaded or resilient compression member such as 26 can be provided as in the embodiment of FIG. 7 to assist the process and also to provide a safeguard against inadvertent disassembly.

Figure 9:
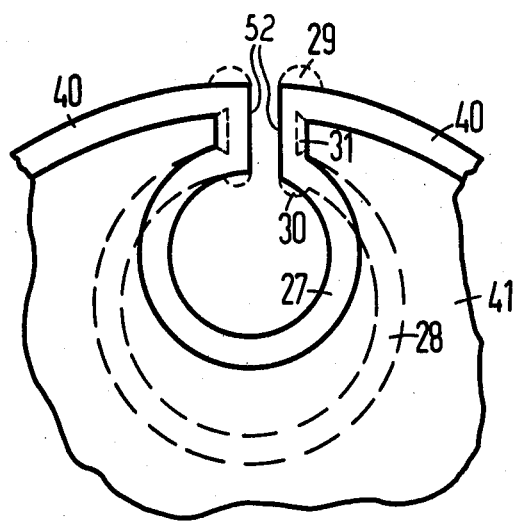
FIG. 9 is an end view of an embodiment of the sealing system in accordance with the present invention.

An enlarged view of the sleeve head 41 is illustrated in FIG. 9 and enables showing how the sealing surfaces 52 are urged together into a sealing engagement. Initially the sleeve head 41 has been stretched so that the cable guide socket 27 has a temporary shape illustrated in broken lines as a socket 28. In a subsequent shrinking process, the socket 28 will revert to the permanent shape or original shape 27 so as to securely grip the cable. In the prestretched shape, however, the joint or sealing surfaces 52 are also provided with bead portions 29, 30 and a recess 31 so that the reinforcing ring of the sleeve head can be easily installed without any difficulty. During the shrinking process, the sealing surfaces 52 will revert to their original permanent shape in which case the beads 29 and 30 disappear to fill the groove 31. As the wall adjacent the surface 52 becomes thicker, the compression member will be embraced to press the surfaces 52 against each other and against any adhesive which is placed therebetween will become compressed.

Figure 10:
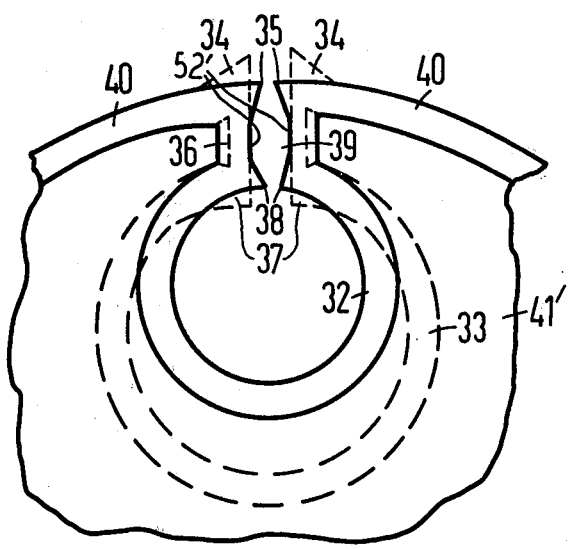
FIG. 10 is a variation of the embodiment of the sealing system of FIG. 9.

A variation of the sleeve head 41' is illustrated in FIG. 10. In this variation, the sleeve head 41' has sealing surfaces 52' which have projections such as 35 and 38 in the permanent relaxed shape and the sleeve has a cable socket 32. In order for the compression member to have temporary thinner walls in the area 36, a shaping or stretching creates bead portions 34 and 37 and an expansion of the socket 32 to a temporary shape illustrated by 33. During heating of the sleeve 41' during the shrinking process, a return to the permanent form shown in unbroken lines with the bead portions 34 and 37 flowing to thicken the walls adjacent the surfaces 52' and to provide the projections 38 and 35 to delineate an area at 39 which has a configuration that will insure that an applied adhesive cannot run out of the area 39 between the surfaces 52'.

Although various minor modifications may be suggested by those versed in the art, it should be understood that we wish to embody within the scope of the patent granted hereon all such modifications as reasonably and properly come within the scope of our contribution to the art.

As a material for performing the invention there can be used polyethylen cross linked by radiation or by addition of a peroxide.

We claim:

1. A sealing system for a longitudinally divided cable fitting element of heat shrinkable material having a longitudinally extending opening, said sealing system comprising a longitudinally extending clamp portion being integrally formed on one side of the opening of the fitting element, said clamp portion having a longitudinally extending groove with undercuts forming shoulders, a longitudinally extending head portion being disposed on the other side of the opening of said fitting element and having undercuts, said clamp portion receiving the bead portion to form a seal of the opening with the undercuts engaging the shoulders to form a snap fit, one of said bead and clamp portions being substantially rigid and unaffected by heat, the other of said bead and clamp portions having a permanent shape which is tightly engaged with said one portion to form the seal, said other portion being deformed from the permanent shape to a temporary shape to enable easy assembly of the portions and returning to said permanent shape when the fitting element is heated to an elevated temperature for a shrinking process so that the portions are easily assembled to close the opening and then treated to create a tight sealing fit.

2. A sealing system according to claim 1, wherein the clamp portion is the one portion and the bead portion after being received in the clamp portion changes to the permanent shape to obtain a tight sealing engagement therein.

3. A sealing system according to claim 1, wherein said bead portion is the other portion extending from a temporary to a permanent shape so that it snugly fills the clamp portion after the heating.

4. A sealing system according to claim 3, wherein the clamp portion has a compression member engaging an outer surface thereof.

5. A sealing system according to claim 1, wherein said clamp portion is the other portion having a temporary configuration so that it shrinks down tightly onto said bead portion subsequent to said heating.

6. A sealing system according to claim 5, wherein the clamp portion has a resilient compression member engaging an outer surface thereof.

7. A sealing system according to claim 1, wherein said clamp portion has a compression member engaging an outer surface thereof to facilitate said snap fit.

8. A sealing system for a longitudinally divided cable fitting element of heat shrinkable material having a longitudinally extending opening, said sealing system comprising a longitudinally extending bead portion being disposed along each side of said opening of the fitting element with each bead portion having a sealing surface extending along the opening with the sealing surfaces facing each other, each bead portion having a permanent shape and a temporary shape which returns to the permanent shape when heated to an elevated temperature for a shrinking process, a clamp portion being a separate compression element being substantially rigid and unaffected by heat, said compression element being telescopically received within the fitting element to support a portion thereof during contraction in a heat shrinking process and to hold the bead portions while in the permanent shape in tight engagement to force said sealing surfaces into sealing closure, said temporary shape of said bead portions enable easy assembly of the separate compression element into the fitting element.

9. A sealing system according to claim 8, wherein the compression element comprises a resilient spring member.

* * * * *